United States Patent [19]

Okada et al.

[11] Patent Number: 5,309,306
[45] Date of Patent: May 3, 1994

[54] COMPLEX MAGNETIC HEAD

[75] Inventors: Masaru Okada; Yoshiyuki Suehiro, both of Hyogo, Japan

[73] Assignee: Mitsubishi Denki Kabushiki Kaisha, Tokyo, Japan

[21] Appl. No.: 895,599

[22] Filed: Jun. 8, 1992

[30] Foreign Application Priority Data

Jun. 10, 1991 [JP] Japan .................................. 3-137436
Jul. 1, 1991 [JP] Japan .................................. 3-160237

[51] Int. Cl.$^5$ ............................................. G11B 5/255
[52] U.S. Cl. ............................................. 360/121
[58] Field of Search ....................................... 360/121

[56] References Cited

U.S. PATENT DOCUMENTS

| | | | |
|---|---|---|---|
| 3,842,494 | 10/1974 | Chiba et al. | 360/121 |
| 4,084,199 | 4/1978 | Dorreboom | 360/121 |
| 4,425,701 | 1/1984 | Takahashi et al. | 360/121 |
| 4,595,964 | 6/1986 | Kimura et al. | 360/121 |
| 4,713,709 | 12/1987 | Yasuda et al. | 360/121 |
| 4,837,922 | 6/1989 | Toriu et al. | 360/121 |
| 4,839,763 | 6/1989 | Matsuzawa | 360/121 |
| 4,941,064 | 7/1990 | Tottori et al. | 360/121 |
| 5,005,097 | 4/1991 | Matsuoka | 360/121 |
| 5,067,230 | 11/1991 | Meunier et al. | 360/121 |
| 5,079,658 | 1/1992 | Sakai et al. | 360/121 |

FOREIGN PATENT DOCUMENTS

| | | | |
|---|---|---|---|
| 83831 | 7/1981 | Japan | 360/121 |
| 156921 | 12/1981 | Japan | 360/121 |
| 63-103408 | 5/1988 | Japan . | |

Primary Examiner—John T. Kwon
Attorney, Agent, or Firm—Wolf, Greenfield & Sacks

[57] ABSTRACT

Complex magnetic head of the present invention eliminates relative magnetic interference between the magnetic heads and relative gap position drift between magnetic heads. The complex magnetic head has high performance and is compatible with lower rank FDDs. The complex magnetic head comprises R/W core track width regulation grooves (52a, 52b, 53a, 53b) filled with glass, erase core track width regulation grooves (55a, 55b, 56a, 56b) filled with glass, R/W core (18, 22) and erase core (20, 24) between shield members formed by these core track width regulation grooves (52a, 52b, 53a, 53b, 55a, 55b, 56a, 56b).

8 Claims, 23 Drawing Sheets

F I G. 1 0
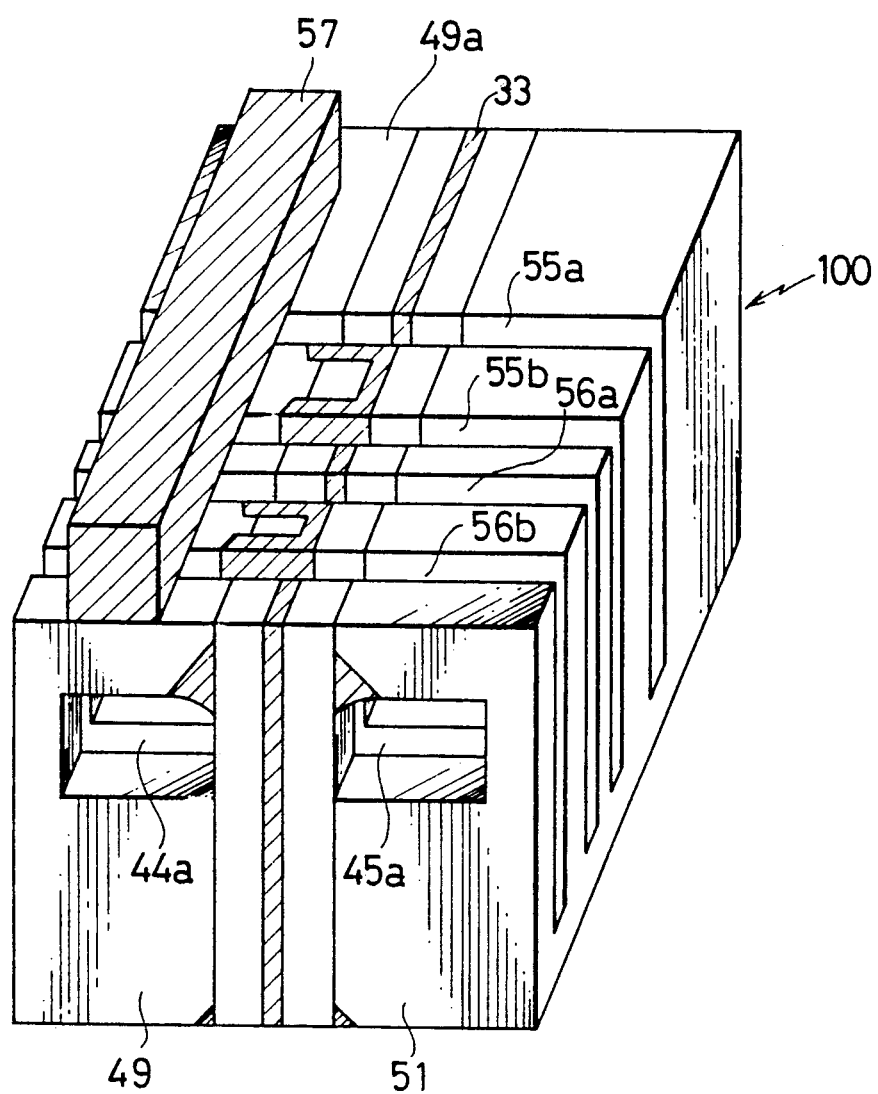

COMPLEX MAGNETIC HEAD

BACKGROUND OF THE INVENTION

The invention relates to a complex magnetic head and manufacturing method thereof for writing and reading magnetic data on the magnetic recording medium by a plurality of data tracks.

In recent years, the size of floppy disks and floppy disk drives (FDD) are becoming smaller such as 8 inches→5.25 inches→3.5 inches. In more recent years, since the need for the note book type of personal computer is especially increasing, demand for the small FDD of 3.5 inch type is rapidly increasing.

Regarding the capacity of FD (Floppy disk), unformatted 1 MB, 1.6 MB and 2 MB type are widely used. The FDD system for these FD uses a tunnel erase system. The upper rank 4 MB FDD using an advanced erase system is going to be shipped in the FDD market. The computer software is becoming larger in proportion to the progress of the information society, and also the demand is increasing for large capacity of FDD which is larger than that of existing FDD by more than 10 times. In order to realize such large capacity FDD using 3.5 inch size FD, it is necessary to use the servo-tracking technology adopted in the hard disk apparatus for increasing the track density, and also to use high recording density medium (e.g. metal disk) and high recording head (e.g. MIG head) for increasing line recording density. Further, in order to use the existent software effectively, it is necessary to provide compatibility with lower rank FDD. That is, the large capacity FDD has to read and write for 4/2/1.6/1 MB disks which have the same track width. Most of the existing higher rank apparatus has this function for the lower rank apparatus. The complex magnetic head apparatus of the present invention can realize the above mentioned large capacity FDD having compatibility with lower rank FDD.

It is said that FDDs have been popular because they have high compatibility between systems via floppy disk, that is between FDDs. In order to assure data compatibility, the data is recorded in a little narrower track width compared with the track pitch. For example, in the 3.5 inch 4 MB FDD using advanced erase head and having 135 TPI (track number per inch) track density, the track pitch is 188 $\mu$m and the data track width is 120 $\mu$m (track width of R/W head). The remaining 68 $\mu$m is called a guard band, and in that area there is no recorded data and no signals. If there is no position drift (off-track), the guard band is not needed. It is sufficient to provide only a R/W head track width. In order to assure the guard band between the data in the case of the off-track situation, an erase head having 250 $\mu$m track width is arranged at some distance before the R/W head. Since the existing low density FDD adopts the above recording system, it is difficult to increase the track density. In order to increase the track density, a closed loop system has been proposed instead of the existing open system using a stepping motor. But the closed loop is very expensive because it uses a track servo apparatus.

FIG. 28 is a perspective view of the prior art complex magnetic head shown in the laid-open patent publication No. 63-103408. In the figure, 1 is a slider. 2 is a first R/W (read write) core assembled in the slider 1. 3 is a first R/W coil coiled around the first R/W core 2. 4 is a first R/W gap formed by the first R/W core 2. 5 is a first R/W head assembled from these elements 2~4. 6 is a second R/W core assembled in the slider 1 together with the first R/W core 2. 7 is a second R/W coil wound around the second R/W core 6. 8 is a second R/W gap formed by the second R/W core 6. 9 is a second R/W head assembled from these elements 6~8.

10 are first erase cores for erasing both side of the data track on the magnetic disk (not shown in the figure) recorded by the first R/W gap 4. 11 are first erase gaps formed by the first erase cores 10. 12 is a first erase coil wound around the first erase cores 10. 13 is a first erase head assembled by the elements 10~12. 14 are second erase cores for erasing both side of the data track on the magnetic disk (not shown in the figure) recorded by the second R/W gap 8. 15 are second erase gaps formed by the second erase cores 14. 16 is a second erase coil wound around the second erase core 14. 17 is a second erase head assembled by the elements 14~16.

The track width of the R/W cores 2 is formed wider than that of the R/W track 6. A first complex head assembled from the first R/W head 5 and the first erase head 13, and a second complex head assembled from the second R/W head 9 and the second erase head 17, are separately formed. then the two complex heads are assembled into one slider 1. The complex head with narrower track width is called a higher rank complex magnetic head, and the complex head with wider track width is called a lower rank complex magnetic head.

The operation of the above conventional complex magnetic head is explained here. Generally, the magnetic head operates as an electro-magnetic transducer or magneto-electric transducer when the magnetic head reads or writes the information on the magnetic disk. In the case of writing information on the data track on the low density magnetic disk, the signal current flows in the first R/W coil 3 of the lower rank complex magnetic head having wider track width. In response to the signal current flowing the first R/W coil 3, a strong magnetic field is generated around the first R/W gap 4 and the information is written in the magnetic recording medium on the surface of the magnetic disk.

The magnetic head reads the information on the data track by amplifying voltage induced to the fist R/W coil 3 when the flux of the magnetic recording medium passes through under the first R/W gap 4. On the other hands, for the data track of the high density magnetic disk, the higher rank magnetic head having narrow track width, that is, the second R/W head 9 reads or writes the information on the data track by the same process described above.

As described above, in the conventional complex magnetic head apparatus, one complex head assembled from the first R/W head 5 and the first erase head 13, and another complex head assembled from the second R/W head 9 and the second erase head 17 are separately formed, then the two complex heads are assembled into one slider 1. Accordingly, there arises some problems in that the productivity of the magnetic head is low, the magnetic cross talk is generated by the leakage magnetic flux between the higher rank complex magnetic head and the lower rank complex magnetic head. Also, it easily happens that the relative position drifts of the gaps 4, 8, 11 and 15 of the heads 5, 9, 13 and 17, respectively, and the resultant performance of the head is derated.

Therefore, it is a primary object of the present invention to provide a complex magnetic head and manufacturing method thereof having high performance and superior productivity but no relative magnetic interference between both heads and no relative position drift between the gaps of both heads.

It is another object of the present invention to provide a complex magnetic head having large capacity and high compatibility with lower rank FDDs. The complex magnetic head has a wide-write-narrow-read system which writes signals with a wide head and reads signals with a narrow head.

SUMMARY OF THE INVENTION

A complex magnetic head of the present invention comprises a R/W core block and an erase core block which are facing each other against both sides of the center core piece and are bound into one magnetic head block by the a melted glass, a R/W core formed between the R/W core track width regulation grooves which have desired width and are filled with molded glass, an erase core formed between the erase core track width regulation grooves which have desired width and are filled with molded glass and are arranged in parallel at the outside of the R/W track width regulation grooves, and a shield member filled with glass in both track width regulation grooves.

A method for manufacturing a complex magnetic head of the present invention comprises (a) a process for forming window grooves in a ferrite piece for a R/W core and in a ferrite piece for an erase core, (b) a process for sputtering gap members on at least one surface of the ferrite piece for the R/W core and the erase core or a center core facing both surfaces of the ferrite core, (c) a process for permeating first glass member in the gap between the ferrite piece for the R/W core and the ferrite piece for the center core in order to bind the two pieces into one R/W core block, (d) a process for permeating the first glass member in the gap between the ferrite piece for the erase core and the ferrite piece for the center core in order to bind the two pieces into one erase core block, (e) a process for forming track width regulation grooves for the R/W core of the lower rank complex head and track width regulation grooves for the R/W core of the higher rank complex head, (f) a process for permeating a second glass member in the gap between the R/W core block and the erase core block where each side of the center core piece is facing at in order to bind the two blocks into one magnetic head block, (b) a process for forming track width regulation grooves for the erase core in parallel at the outside of the R/W track width regulation grooves where a part of the molded glass is included, (h) a process for permeating a third glass member in the erase regulation grooves, and (i) a process for forming grooves used for winding coils by removing a part of the molded glass in the erase track width regulation grooves.

BRIEF DESCRIPTION OF THE DRAWING

FIG. 10 is a perspective view of a magnetic head on which a glass rod is put in order to fill the glass into the grooves.

DETAILED DESCRIPTION OF THE PREFERRED EMBODIMENTS

Figure 1:
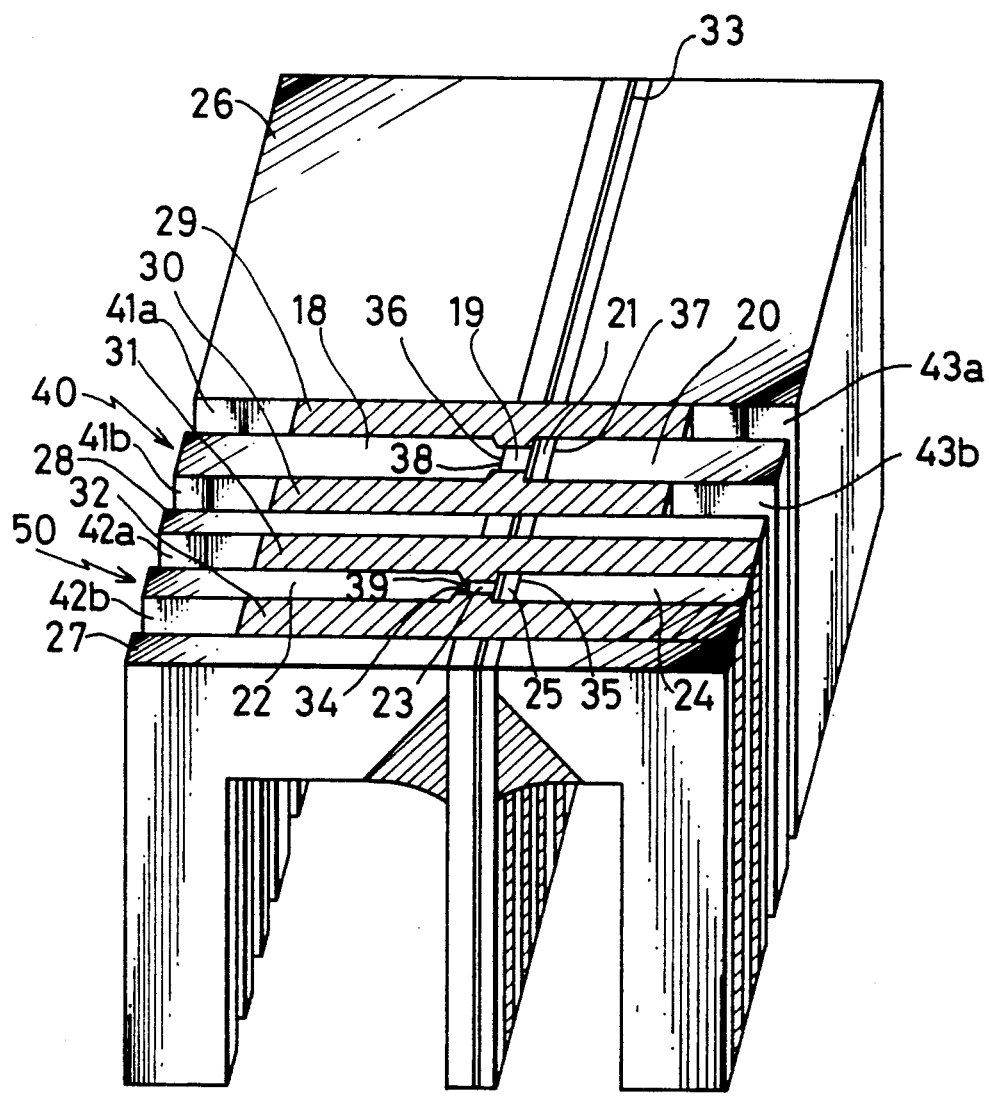
FIG. 1 is a perspective view of a principal part of a complex magnetic head of a first embodiment of the present invention.

FIG. 1 is a perspective view of a principal part of a complex magnetic head of a first embodiment of the present invention. In FIG. 1, 18, 19, 20 and 21 are a R/W core leg, a center core leg for the R/W core, an erase core leg and a center core leg for the erase core comprising the lower rank complex head 40 having wide track width, respectively, which are comprised of metal oxide Mn-Zn ferrite, Ni-Zn ferrite and so on. 22, 23, 24 and 25 are a R/W core leg, a center core leg for the R/W core, an erase core leg and a center core leg for the erase core, comprising the higher rank complex head 50 having narrow track width, respectively, which are comprised of the same substances as that of the lower rank complex head 40.

26 and 27 are sliders which are comprised of the same members as that of elements 18~25. 28 is a magnetic shield which is comprised of the same member as that of elements 18~27. 29, 30, 31 and 32 are packing members comprised of a non-magnetic member such as glass. The packing members are filled in the space between the slider 26 and the lower rank complex head 40, between the lower rank complex head 40 and the magnetic shield 28, between the magnetic shield 28 and the higher rank complex head 50, and between the higher rank complex head 50 and the slider 27. 33 is a center spacer comprised of a non-magnetic member such as glass ceramic, and magnetically separates the R/W core 22 from the erase core 24 in the higher rank complex head 50, and the R/W core 18 from the erase core 20 in the lower rank complex head 40.

34, 35, 36 and 37 are a R/W gap and an erase gap in the higher rank complex head 50, and a R/W gap and an erase gap in the lower rank complex head 40, separately, which are comprised of non-magnetic member such as $S_iO_2$ and $T_{a2}O_5$ formed by a thin film forming technology such as sputtering and vapor deposition. 38 is a magnetic film formed between the R/W core 18 and the gap 36 in the lower rank complex head 40 by the thin film forming technology such as sputtering and ion-plating in order to generate a strong magnetic field over the gap 36. 39 is a magnetic film formed between the R/W core 22 an the gap 34 in the higher rank complex head 50 by the same technology described above in order to generate a strong magnetic field over the gap 34. The magnetic film is comprised of a magnetic member having high saturation magnetic density such as sendust (Fe-Si-Al) or amorphous alloy (e.g. Co-Zi-Nb). 41*a* and 41*b* are grooves when a R/W coil (not shown in the figure) of the lower rank complex head 40 is wound therein. 42*a* and 42*b* are grooves, where a R/W coil (not shown in the figure) of the higher rank complex head 50 is wound therein. 43*a* and 43*b* are grooves, where an erase coil (not shown in the figure) of the lower rank complex head 40 is wound therein. An erase coil of the higher rank complex head 50 is not used in the first embodiment of the present invention. In the embodiment, a magnetic shunt member is put on between the R/W core leg or the erase core leg and the center core leg in order to form a magnetic closed circuit, after a coil with bobbin in inserted into each R/W core leg and an erase core leg of the lower head.

Figure 2:
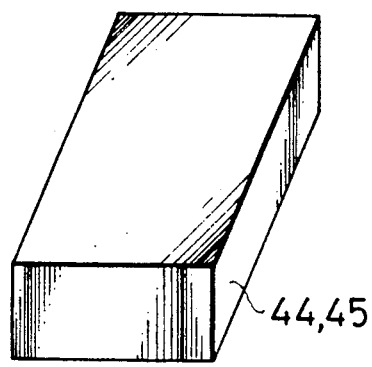
FIG. 2 shows ferrite core pieces for forming R/W cores and erase cores of the lower and higher rank complex heads, respectively.
Figure 3:
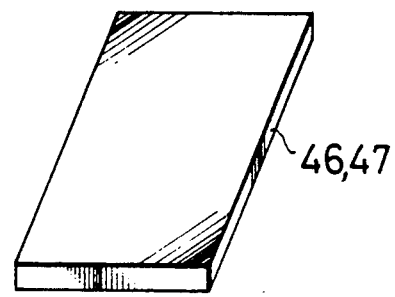
FIG. 3 shows ferrite core pieces for forming the R/W center cores of the lower and higher rank complex heads, respectively, and the erase center cores.

The manufacturing method of the complex magnetic head of the first embodiment is explained here. FIG. 2 shows ferrite core pieces 44, 45 for forming the R/W cores 18, 22, and the erase cores 20, 24 of the lower and higher rank complex heads 40, 50, respectively. FIG. 3 shows ferrite core pieces 46, 47 for forming the R/W center cores 19, 23 of the lower and higher rank complex heads 40, 50 respectively, and the erase center cores 21, 25. The ferrite core pieces 44~47 are ground and lapped into a desired dimension. The gap surface of the ferrite core pieces 44~47 are finished into a mirror surface without damaged layer induced by machining. These pieces are used also for components of the sliders 26, 27 and the magnetic shield 28.

Figure 4:
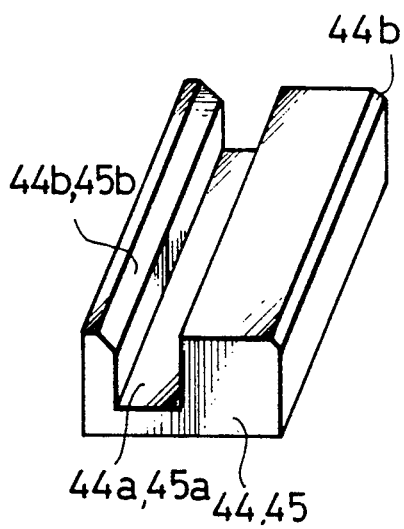
FIG. 4 shows a ferrite core piece having grooves for coil and mold glass.

FIG. 4 shows a ferrite core piece having grooves for coil and mold glass. In FIG. 4, grooves 44*a*, 45*a* are formed in the ferrite core pieces for winding the coil therein, and grooves 44*b*, 45*b* are formed in the ferrite core pieces for putting the mold glass therein.

Figure 5:
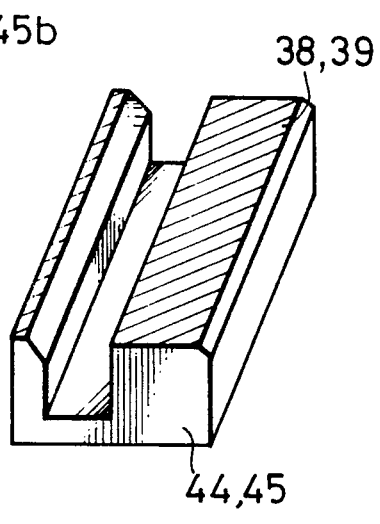
FIG. 5 shows magnetic film on the surface of the ferrite core piece.

FIG. 5 shows magnetic film on the surface of the ferrite core piece. In FIG. 5, magnetic films 38, 39 are formed on the surfaces of the ferrite core pieces 44, 45 of the R/W cores adjacent to the gaps 34, 36 (shown by hatching) by sputtering. Then, gap members (not shown in the figure) are formed on the surfaces where the ferrite core pieces 44, 45 and the ferrite center core pieces 46, 47 are in face by sputtering. In this case, the gap members may be formed only on the surface of the center core piece 46, 47, or the ferrite core pieces 44, 45.

Figure 6:
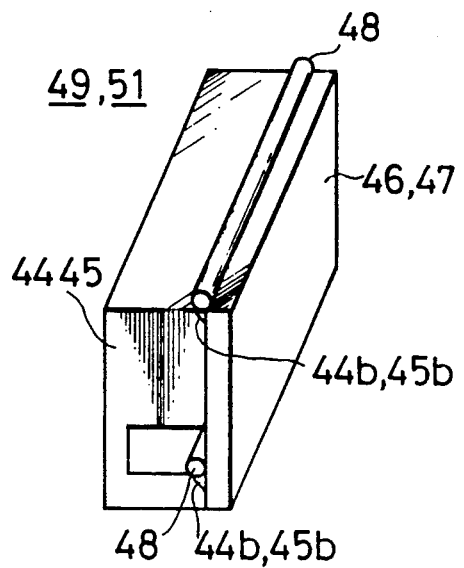
FIG. 6 shows a perspective view of a R/W core block and erase core block where the mold glasses are put on the grooves.

FIG. 6 is a perspective view of the R/W core block and the erase core block where the mold glasses are put on the grooves. In FIG. 6, the ferrite core piece 44 and the ferrite center core piece 46 comprising the R/W core 49, and the ferrite core piece 45 and the ferrite center core piece 47 comprising the erase core 51, are fixed on both sides of the gap member. Then, the glass rods 48 are put on the grooves 44*b*, 45*b* and melted by applying high temperature. The melted glass rods penetrate in the gaps and bind the ferrite core pieces 44, 45 and the ferrite center core pieces 46, 47, respectively. As a result, the R/W core 49 and the erase core 51 are assembled.

Figure 7:
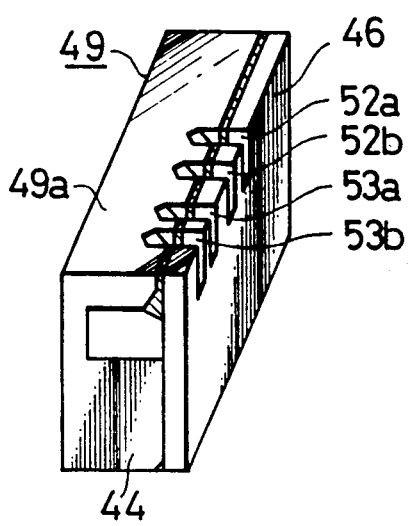
FIG. 7 shows a R/W core having a plurality of track width regulation grooves.

FIG. 7 shows a R/W core 49 having a plurality of track width regulation grooves. The R/W core 49 has track width regulation grooves 52*a*, 52*b* for the R/W core of the lower rank complex head 40, and track width regulation grooves 53*a*, 53*b* for the R/W core of the higher rank complex head 50. These grooves are ground downward obliquely from the surface 49*a* facing the disk to the center core surface 46, for example, by a diamond wheel cutter. In the figure, the R/W core block has only four track width regulation grooves 52*a*, 52*b*, 53*a* and 53*b* for one R/W head, but the R/W core block may be longer and have a lot of track width regulation grooves in one long R/W core block from the manufacturing point of view.

Figure 8:
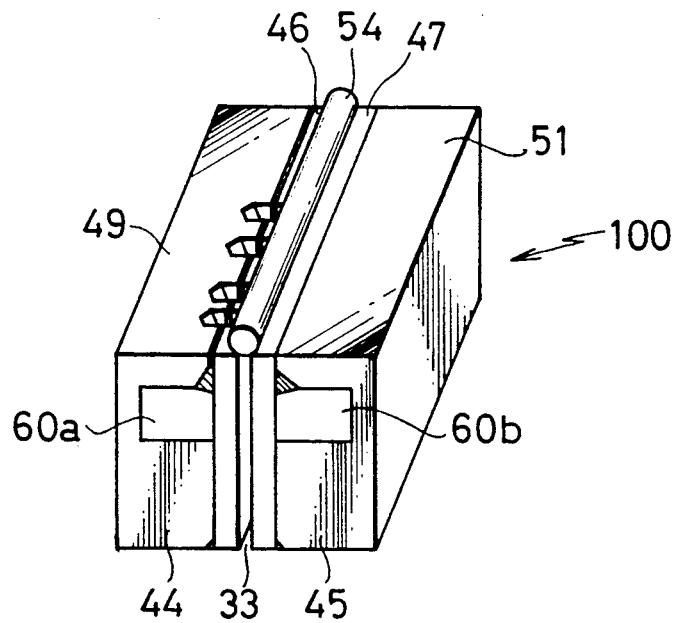
FIG. 8 is a perspective view of a R/W core block, an erase core block and a glass rod put on the gap between them.

FIG. 8 is a perspective view of a R/W core block, an erase core block and a glass rod put on the gap between them. After the track width regulation grooves of the R/W core are ground into desired shapes, the R/W core block 49 and the erase core block 51 are arranged so that the ferrite pieces of the center cores 46, 47 face each other with the distance corresponding to the center spacer 33. Then the ceramic spacer 33 comprised of non-magnetic body is inserted into the center gap between the center ferrite pieces 46, 47. Then a glass rod is put on the center gap and the temperature is increased up to the melting point of the glass rod, while a certain amount of the force is applied between both core blocks 49, 51. The glass rod melts and fills the gap 33 and the track width regulation grooves 52*a*, 52*b*, 53*a* and 53*b*.

Figure 9:
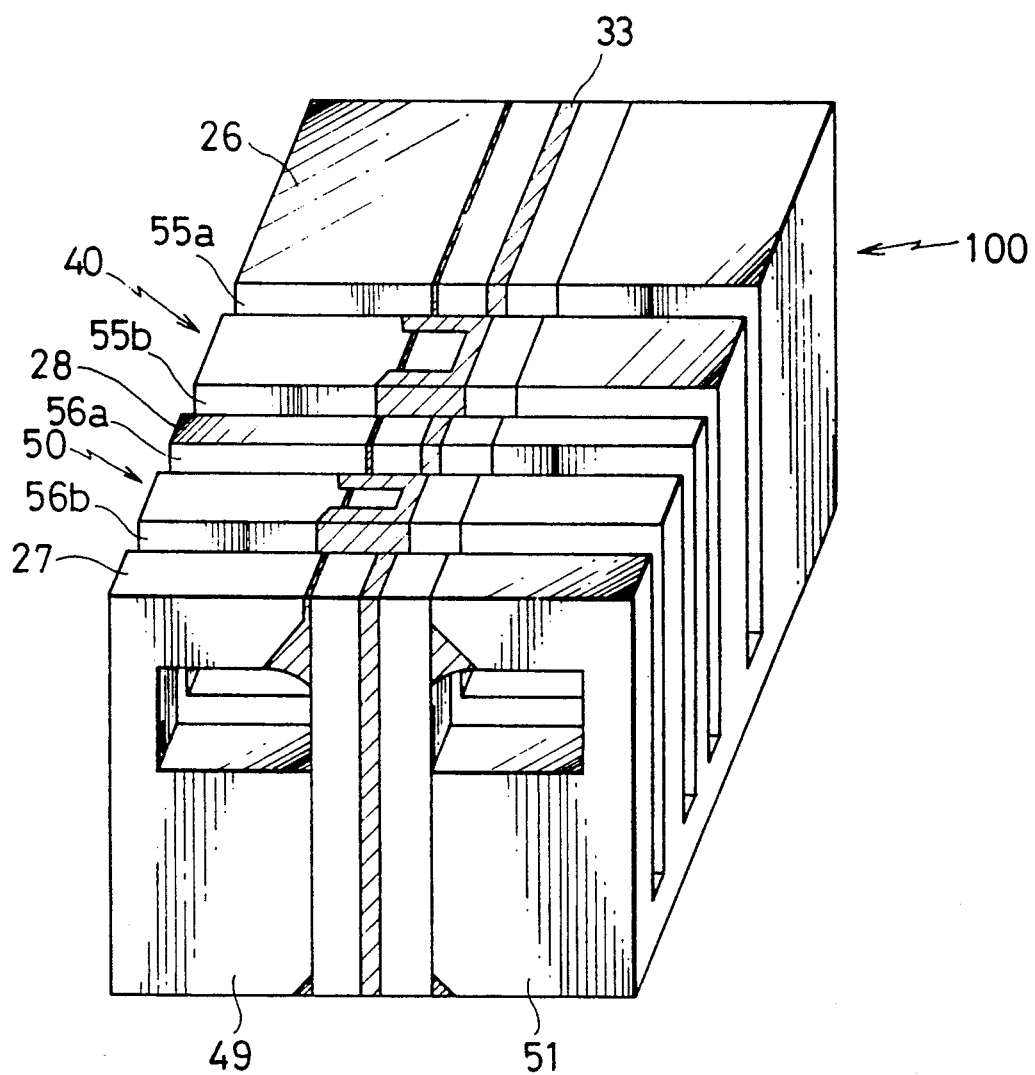
FIG. 9 is a perspective view of a magnetic head in which the track width regulation grooves are arranged.

FIG. 9 is a perspective view of a magnetic head block in which the track width regulation grooves are arranged. The track width regulation grooves 55*a*, 55*b* of the erase core of the lower rank complex head 40 and the track width regulation grooves 56*a*, 56*b* of the erase core of the higher rank complex head 50 are ground downward obliquely from the surface 49*a* facing the disk to the side surface of both core 49, 51, for example, by a diamond wheel cutter. The remaining portions after grinding the track width regulation grooves 55a, 55b, 56a and 56b are arranged in parallel and include portions of the track width regulation grooves 52a, 52b, 53a and 53b which are filled with glass. The depth of the grooves is a little shallow from the bottom of the core blocks 49 and 51 as shown in the figure. The track width regulation grooves 55a and 56b function as separation grooves from the slider 26 and 27. The track width regulation grooves 55b and 56a function as separation grooves from the magnetic shield 28.

FIG. 10 is a perspective view of a magnetic head block on which a glass rod is put in order to fill the glass into the grooves formed by the former process. After the track width regulation grooves of the erase cores are ground, a glass rod 57 is put on the surface facing the disk of the core block 49. The temperature is increased up to the melting point of the glass rod. The glass rod melts and fills the grooves 55a, 55b, 56a and 56b. If the glass rod is filled down to the parts of the winding grooves 44a, 45a, the glass rod may be filled into the deep portion of the grooves 55a, 55b, 56a and 56b. In case of filling the glass rod into the grooves, a certain force is applied to the side surface of the head block 100 via the mica plates in order to prevent the glass from spilling out.

Figure 11:
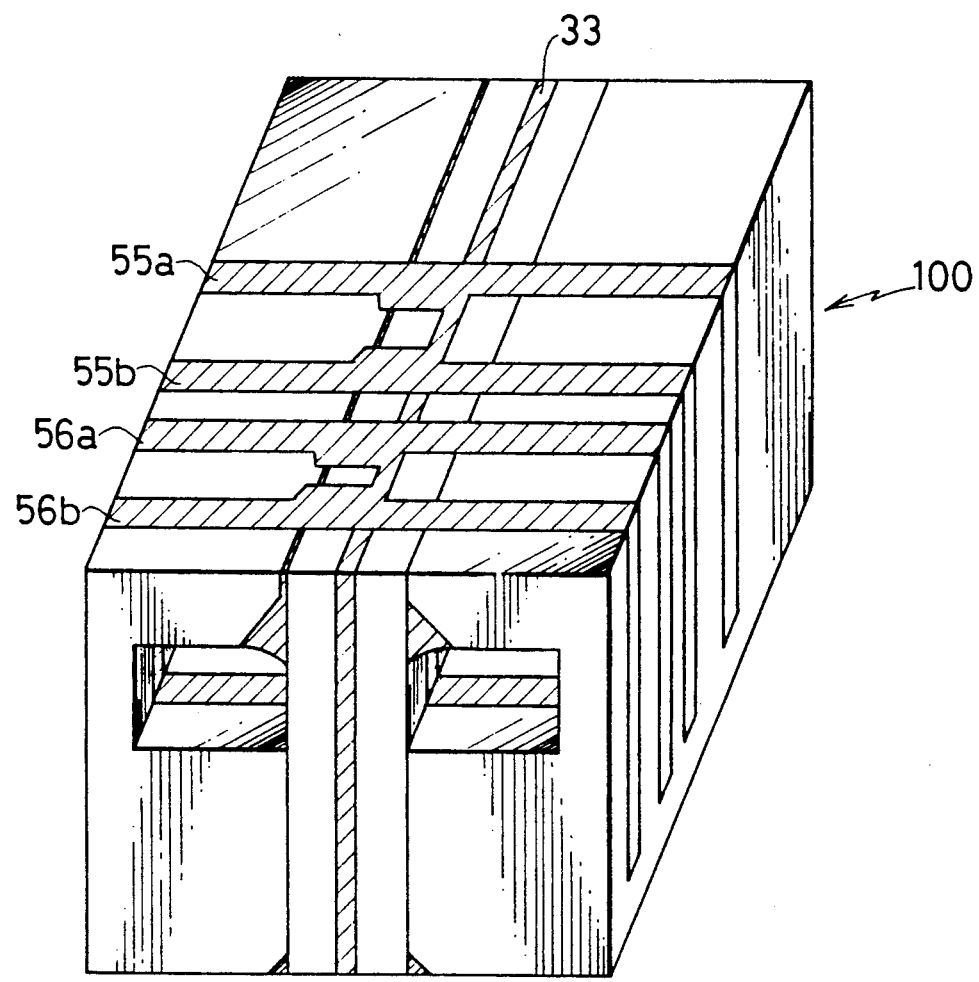
FIG. 11 is a perspective view of a final magnetic head block formed by the former several processes.

FIG. 11 is a perspective view of a final magnetic head block formed by the former several processes. In the figure, the glass is filled in all grooves 55a, 55b, 56a and 56b and in the center gap 33.

Figure 12:
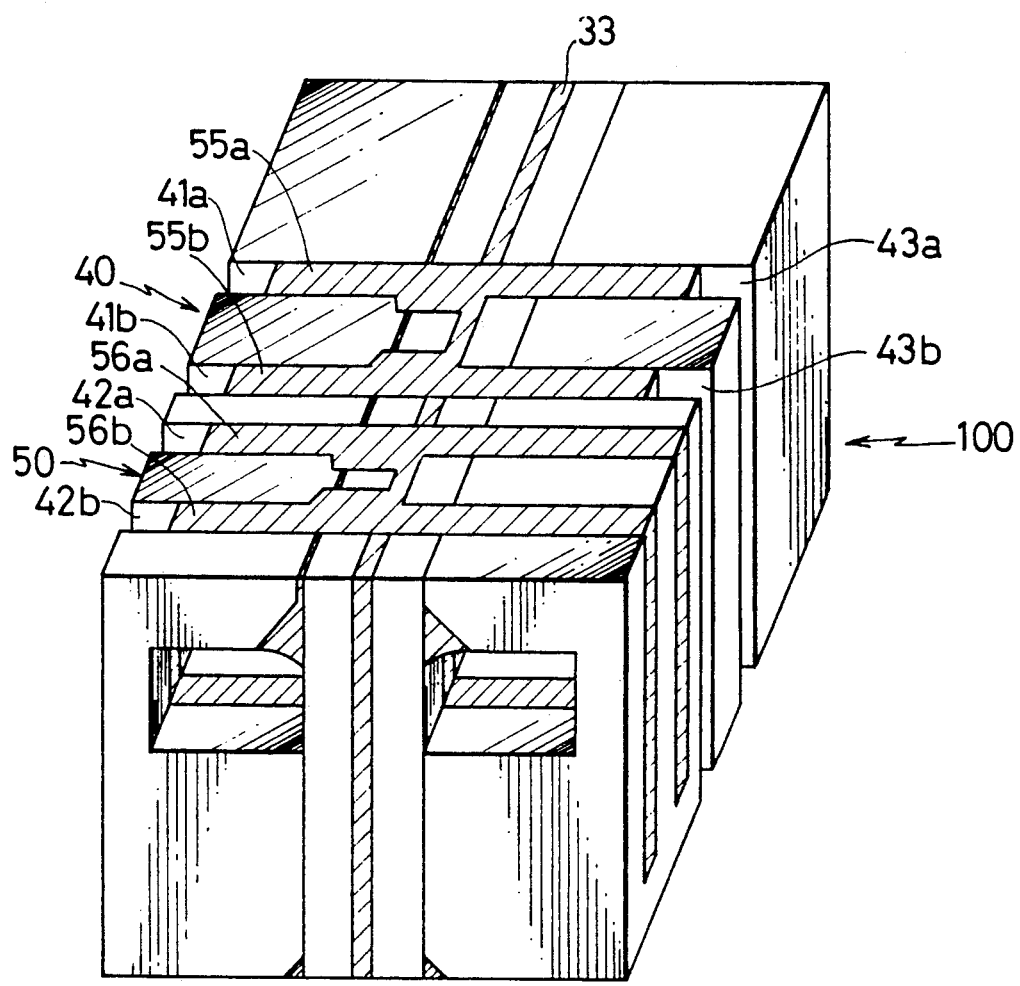
FIG. 12 is a perspective view of a magnetic head block having grooves for winding coils.

FIG. 12 shows a perspective view of a magnetic head block having grooves for winding coils. After these processes are finished, the edge portions of the glass in the grooves 55a, 55b, 56a and 56b are ground, for example, by a diamond wheel cutter, in order to provide winding grooves 41a and 41b for the R/W coil, winding grooves 43a and 43b for the erase coil of the lower rank complex head 40, and winding grooves 42a and 42b for the R/W coil of the higher rank complex head 50.

Figure 13:
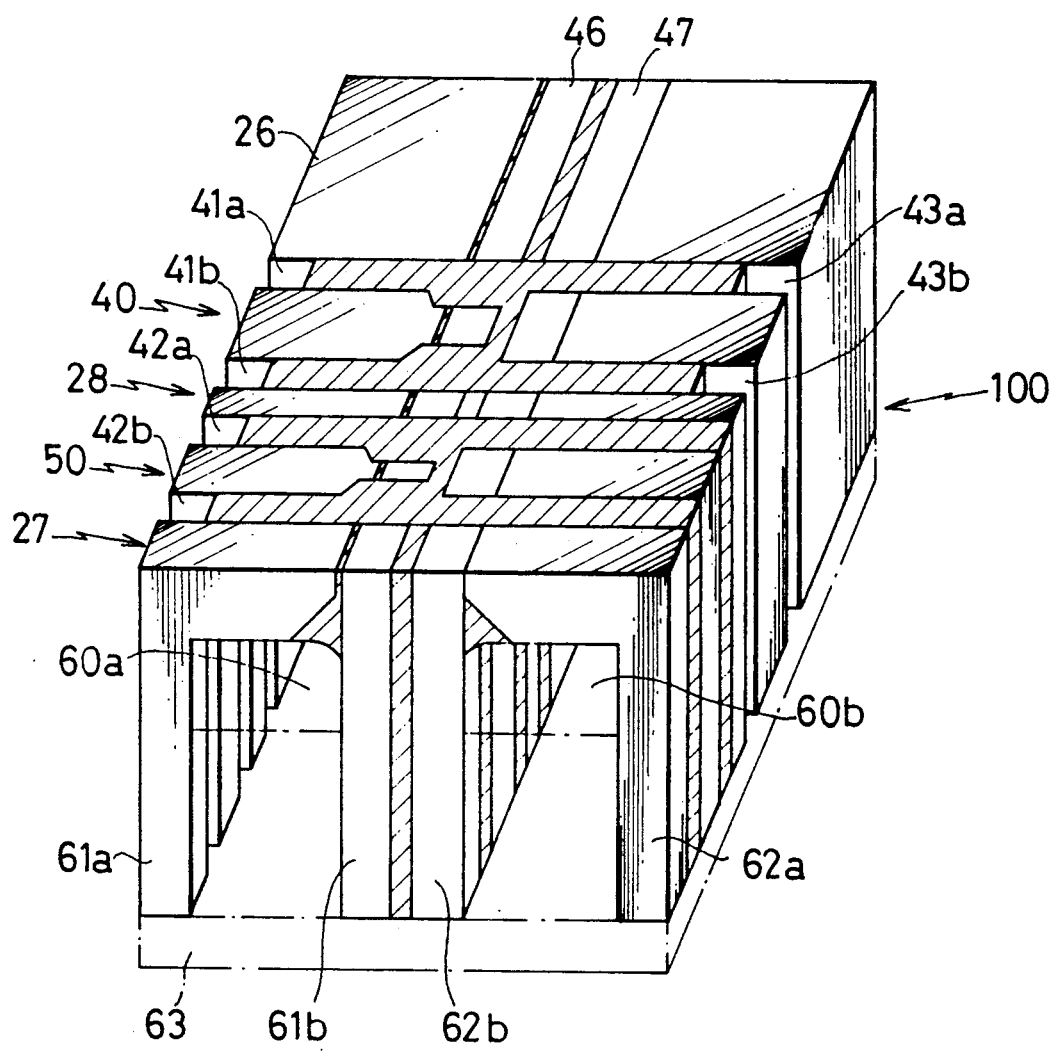
FIG. 13 is a perspective view of a magnetic head block in which the windows are extended downward and the bottom portion thereof is cut down.

FIG. 13 is a perspective view of a magnetic head block in which the windows 60a and 60b are extended downward and the bottom portion 63 of the head core block 100 is cut down in order to provide core legs 61a, 61b, 62a and 62b for being inserted by the formed coil. As shown in FIG. 13, the magnetic head block 100 comprises a higher rank complex head 50, a lower rank complex head 40, a magnetic shield 28 and both side sliders 26 and 27 in one body.

Second embodiment

In the above first embodiment, metal oxide ferrite with low saturation magnetic flux is supplied to the core head member, and the magnetic films 38 and 39 are formed on one side of the R/W gaps 36 and 34, respectively. In the second embodiment, the magnetic films 38 and 39 may be formed on both sides of the R/W gaps 36 and 34. Further, if the ferrite alloy having high hardness and high saturation magnetic flux deposited by the hyperfine super saturation crystal phase are supplied to the core head member, the magnetic film may be omitted. According to the second embodiment, a magnetic head with superior abrasion resistance and recording ability is obtained.

Third embodiment

In the above first embodiment, the same kind of the glass rods 48, 54 and 57 are used for filling the grooves. In this case, it is necessary to apply a certain force to the side surface of the head block 100 in order to maintain the gap 33 to be constant. But, in the third embodiment, the melting points for the respective glass rods are selected to different temperatures so that the glass grooves formed in the former process do not melt in the succeeding melting processes. Accordingly, in the third embodiment, it is not needed to apply a certain force to the side surface of the head block 100 in order to maintain the gap width constant.

Fourth embodiment

In the above first embodiment, the center spacer 33 is formed by the mold glass. But, in the fourth embodiment, a non-magnetic ceramic such as a calcium titanate or a barium titanate may be used for forming the center spacer 33. In this case, glass films are formed in advance on both surfaces of the ceramic board or on the surfaces of the center cores 46 and 47 by a vapor deposition or sputtering process.

Fifth embodiment

Figure 14:
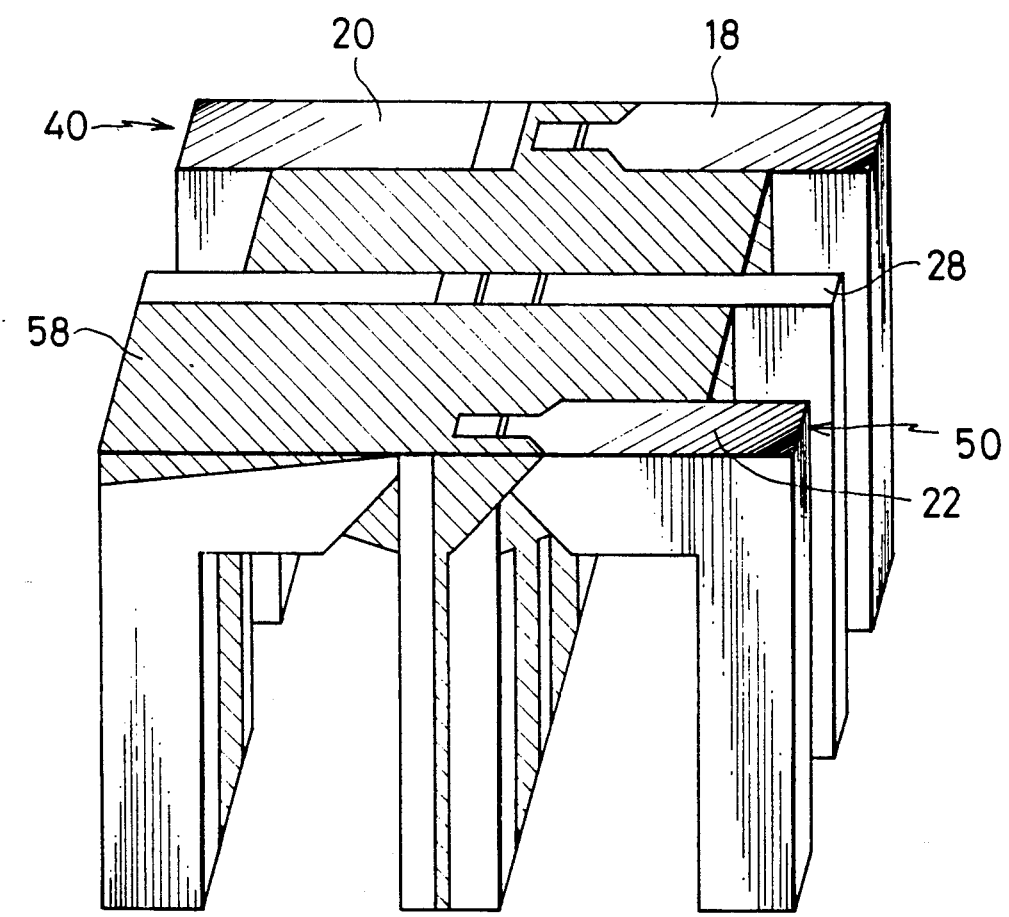
FIG. 14 is a perspective view of a magnetic head block having no sliders of a fifth embodiment of the present invention.

FIG. 14 is a perspective view of a magnetic head block having no sliders of a fifth embodiment of the present invention. In the fifth embodiment, the sliders are formed separately and mounted together with the magnetic block. The magnetic block of the fifth embodiment comprises an advanced erase type lower rank complex head 40, a self over write type single gap higher rank complex head 50 and a magnetic shield 28 between the complex heads 40 and 50. Non-magnetic glass member 58 is filled on the surface of the erase head core, facing to the disk, of the higher complex head 50. The magnetic head of the fifth embodiment is applied to the floppy disk apparatus used for recording the data on both surfaces of the disk. By the above configuration, magnetic interference may be reduced between the two magnetic heads arranged over both sides of the disk.

Sixth embodiment

Figure 15:
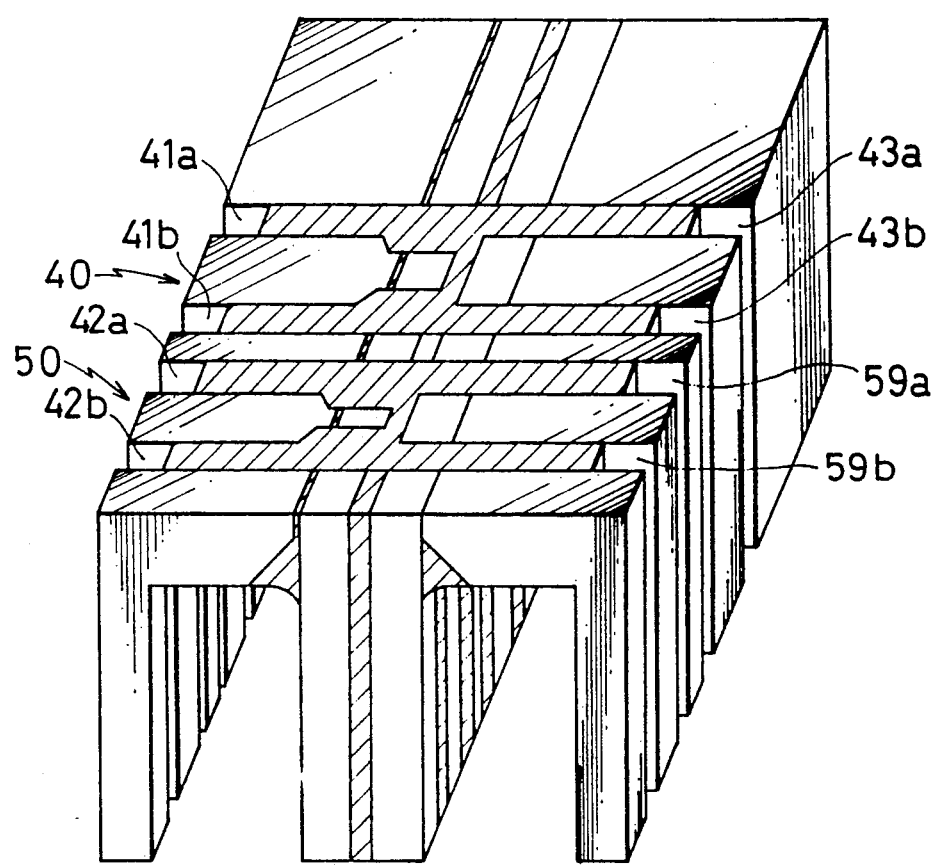
FIG. 15 is a perspective view of a magnetic head block of a sixth embodiment of the present invention.

FIG. 15 is a perspective view of a magnetic head block of a sixth embodiment of the present invention. In the sixth embodiment, the magnetic head comprises a lower rank complex head 40 and a higher rank complex head 50, both having an advanced erase head, respectively, wherein the higher rank complex head 50 comprises grooves 59a and 59b for winding an erase coil which is different from the first embodiment.

Seventh embodiment

Figure 16:
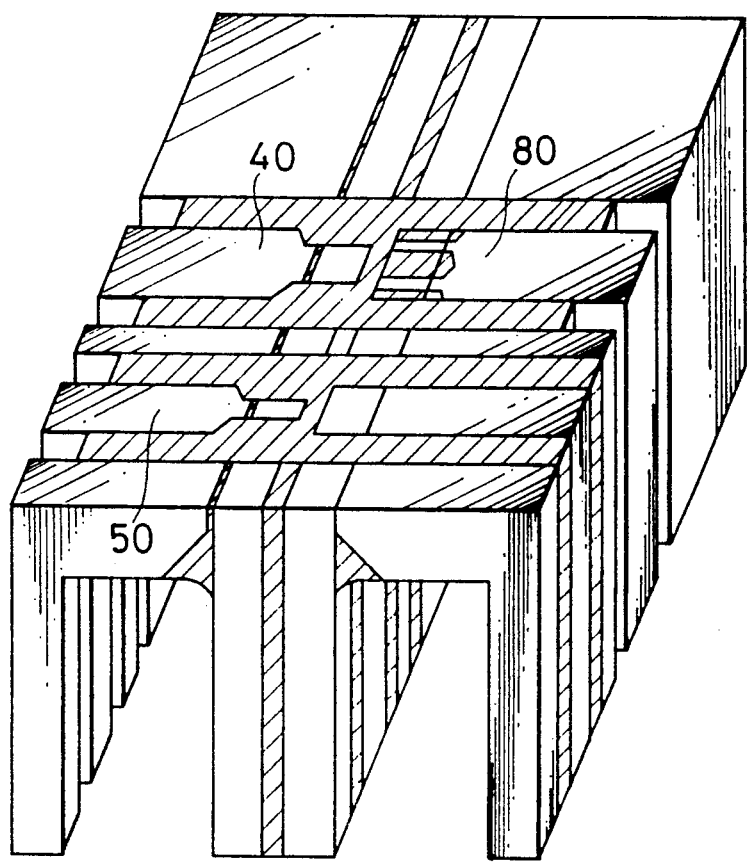
FIG. 16 is a perspective view of a magnetic head block of a seventh embodiment of the present invention.

FIG. 16 is a perspective view of a magnetic head block of a seventh embodiment of the present invention. In the seventh embodiment, the lower rank complex head 40 comprises a tunnel type erase head 80, and the higher rank complex head comprises a single gap R/W core.

Eighth embodiment

Figure 17:
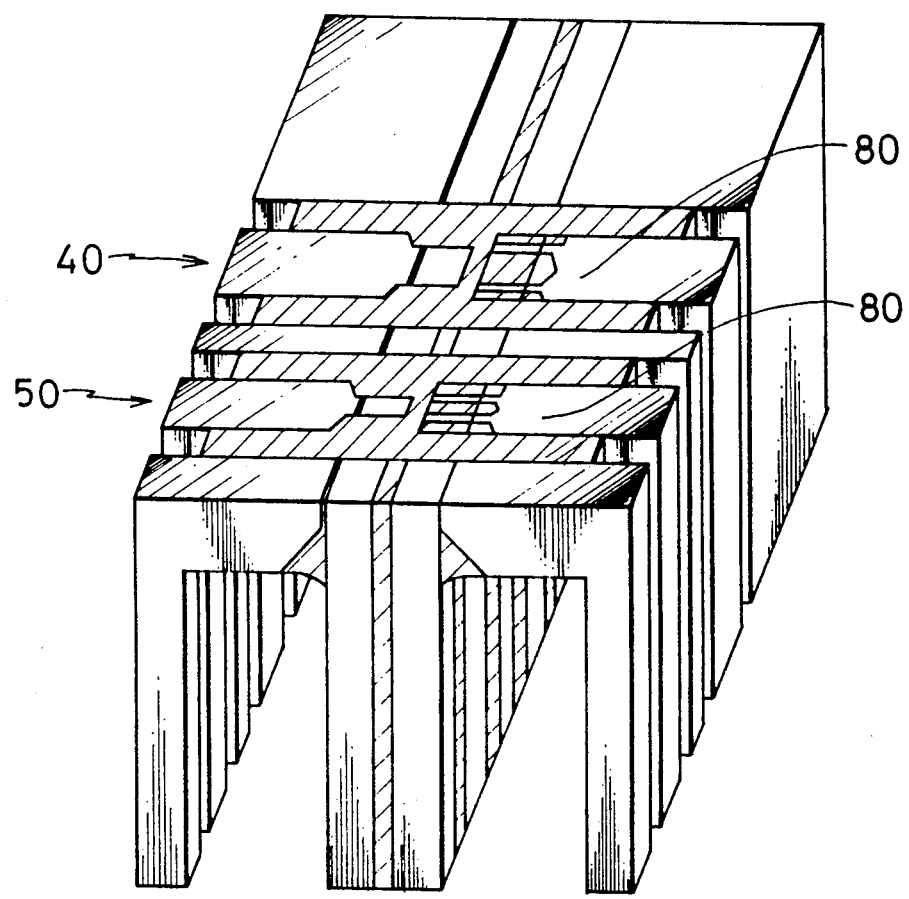
FIG. 17 is a perspective view of a magnetic head block of an eighth embodiment of the present invention.

FIG. 17 is a perspective view of a magnetic head block of an eighth embodiment of the present invention. In the eighth embodiment, both the lower rank complex head 40 and the higher rank complex head 50 are comprised of a respective tunnel type erase head 80.

Ninth embodiment

Figure 18:
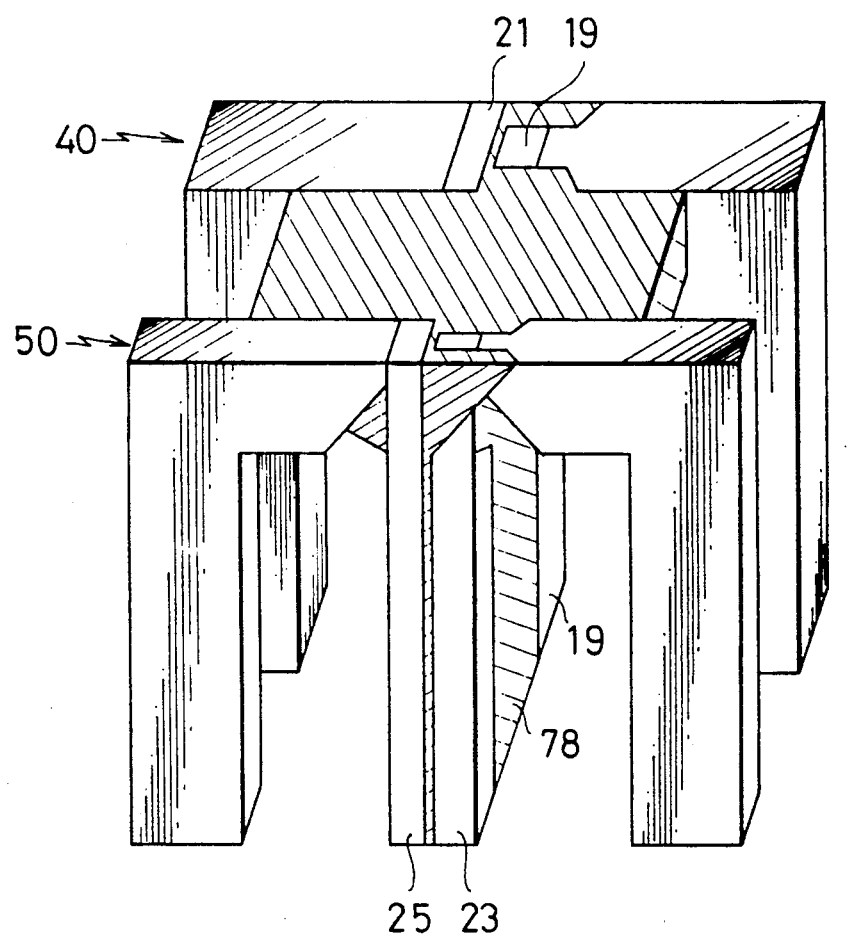
FIG. 18 i a perspective view of a magnetic head block of a ninth embodiment of the present invention.

FIG. 18 is a perspective view of a magnetic head block of a ninth embodiment of the present invention. In the ninth embodiment, the magnetic head has no sliders and no magnetic shield. These sliders are formed separately and mounted together with the magnetic head block. Both complex heads 40 and 50 comprise respective R/W head core and respective advanced erase core. Glass 78 is filled between the center cores 19, 21 in the lower rank complex head 40 and the center cores 23, 25 in the higher rank complex head 50.

Tenth embodiment

Figure 19:
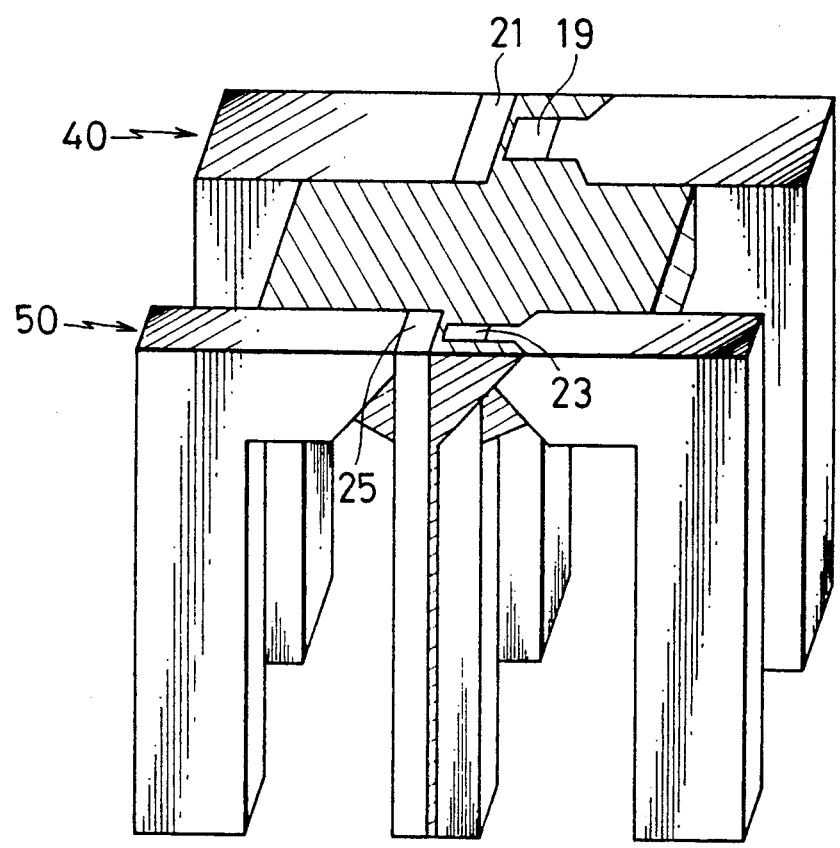
FIG. 19 is a perspective view of a magnetic head block of a tenth embodiment of the present invention.

FIG. 19 is a perspective view of a magnetic head block of a tenth embodiment of the present invention. In the tenth embodiment, the magnetic head has no sliders and no magnetic shield. These sliders are formed separately and mounted together with the magnetic head block. The lower rank complex head 40 is comprised of an advanced erase head and the higher rank complex head 50 is comprised of a single gap R/W head. Between the center cores 19, 21 in the lower rank complex head 40 and the center cores 23, 25 in the higher rank complex head 50, there is no mold glass filled. Accordingly, the winding can be provided around the center cores 23, 25 of the higher rank complex head 50 in order to obtain low inductance and high efficiency.

Eleventh embodiment

Figure 20:
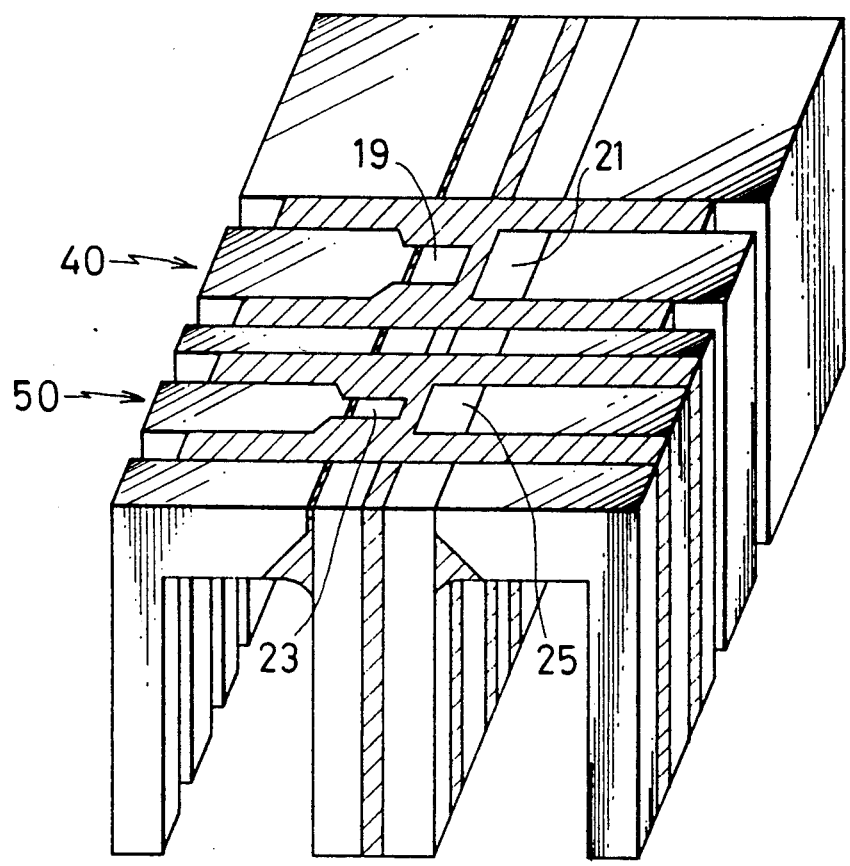
FIG. 20 is a perspective view of a magnetic head block of an eleventh embodiment of the present invention.

FIG. 20 is a perspective view of a magnetic head block of an eleventh embodiment of the present invention. In the eleventh embodiment, the magnetic head block has no mold glass between the center cores 19 and 21, and between the center cores 23 and 25. The lower rank complex head 40 is comprised of an advanced erase head, and the higher rank complex head 50 is comprised of a single gap R/W head.

Twelfth embodiment

Figure 21:
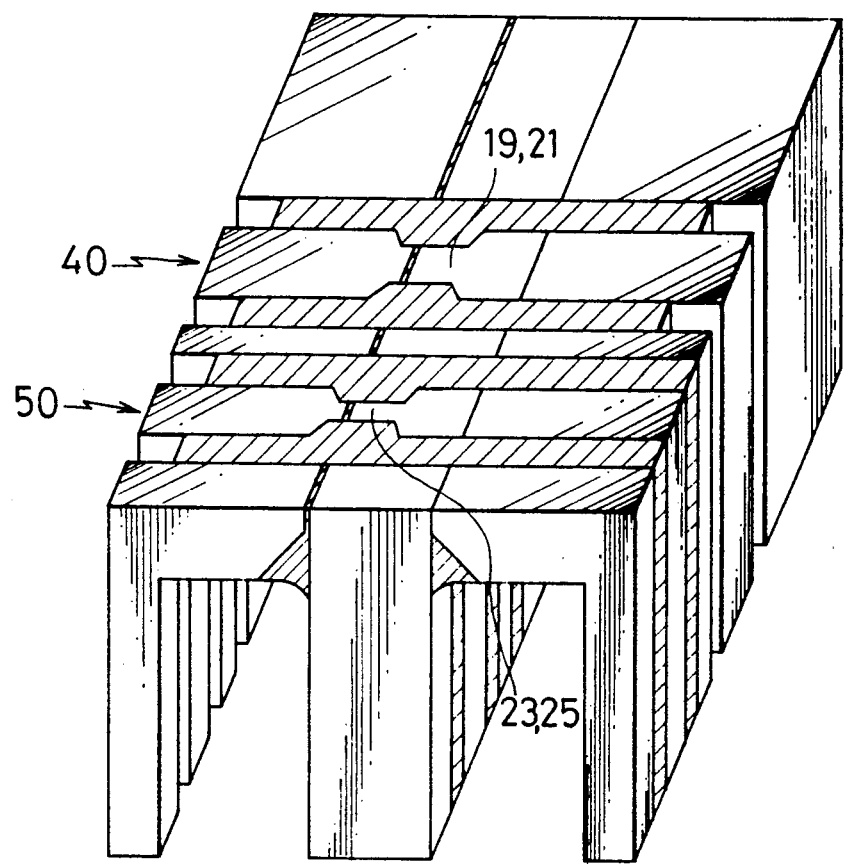
FIG. 21 is a perspective view of a magnetic head block of a twelfth embodiment of the present invention.

FIG. 21 is a perspective view of a magnetic head block of a twelfth embodiment of the present invention. The lower rank complex head 40 is comprised of an advanced erase head and the higher rank complex head 50 is comprised of a single gap R/W head. In the twelfth embodiment, there is no center spacer 33 between the center core legs 19 and 21, and between the center core legs 23 and 25. Therefore, the center cores are integrated into one body and a high efficiency R/W core is obtained.

Thirteenth embodiment

Figure 22:
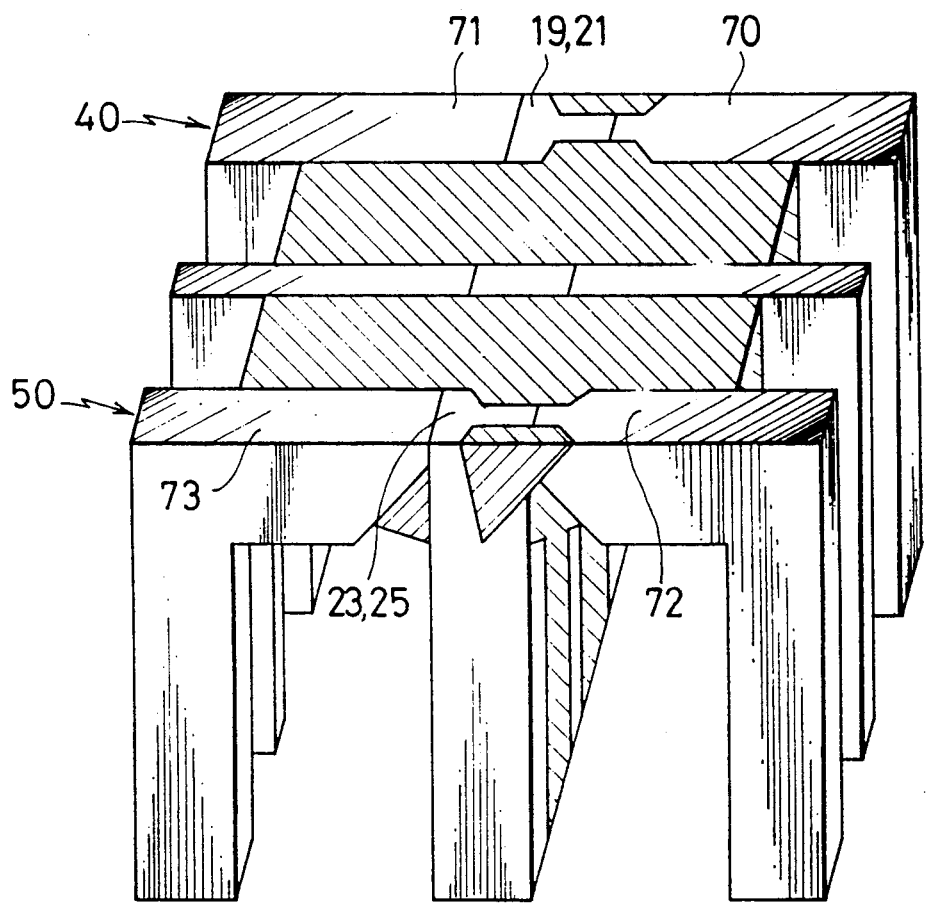
FIG. 22 is a perspective view of a magnetic head block of a thirteenth embodiment of the present invention.

FIG. 22 is a perspective view of a magnetic head block of a thirteenth embodiment of the present invention. In this embodiment, the magnetic head has no sliders. These sliders are formed separately and mounted together with the magnetic head block. Therefore the slider portions may be supplied with strong abrasion resistance material. The magnetic head block of the present embodiment may be manufactured without forming the slider portions from the beginning, or the slider portion may be cut out after the magnetic block has been formed. The lower rank complex head 40 is comprised of an advanced erase head 71 and R/W head 70. The higher rank complex head 50 is comprised of a W (wide writing) head 73 and R (narrow reading) head 72. In this embodiment, there is no center spacer 23 between the center core legs 19 and 21, and between the center core legs 23 and 25. Therefore, the center cores are integrated into one body and a high efficiency core is obtained during the reproduction.

Fourteenth embodiment

Figure 23:
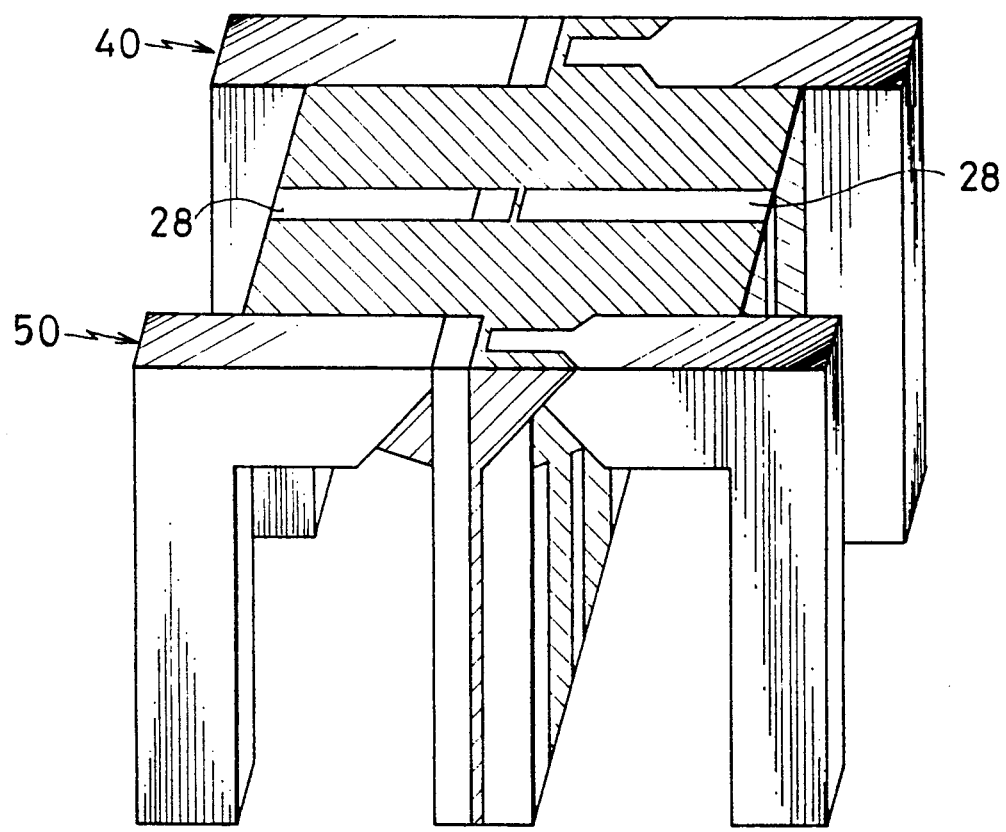
FIG. 23 is a perspective view of a magnetic head block of a fourteenth embodiment of the present invention.

FIG. 23 is a perspective view of a magnetic head block of a fourteenth embodiment of the present invention. In this embodiment, both end portions of the magnetic shield 28 are cut out at the same time when the mold glass 43 is cut out in FIG. 13. Other configurations are the same as that of the thirteenth embodiment in FIG. 22. Since both end portions of the magnetic shield 28 are cut out, magnetic energy absorption into the magnetic shield is reduced when the signal is recorded. As a result, the degradation of the recording efficiency can be avoided.

Fifteenth embodiment

Figure 24:
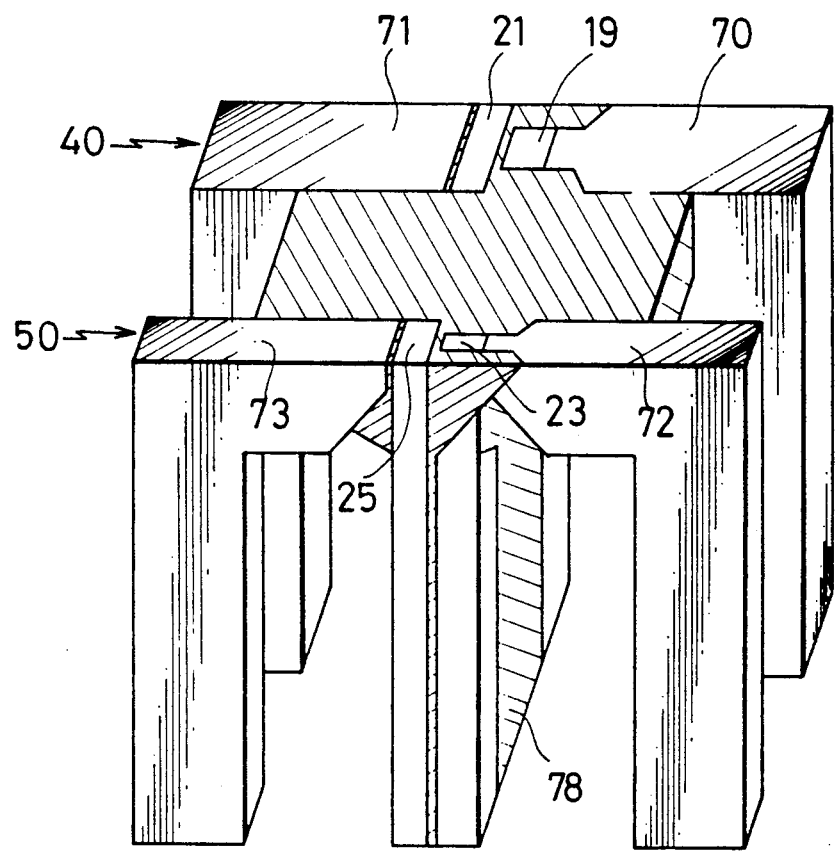
FIG. 24 is a perspective view of a magnetic head block of a fifteenth embodiment of the present invention.

FIG. 24 is a perspective view of a magnetic head block of a fifteenth embodiment of the present invention. In this embodiment, the magnetic head has no sliders and no magnetic shield. The lower rank complex head 40 is comprised of an advanced erase head 71 and R/W head 70. The higher rank complex head 50 is comprised of a W (wide writing) head 73 and R (narrow reading) head 72. Between the center cores 19, 21 in the lower rank complex head 40 and the center cores 23, 25 in the higher rank complex head 50, the mold glass 78 is filled. The higher rank complex head 50 is isolated from the lower rank complex head 40 for a certain distance such that the interference between them becomes negligible.

Sixteenth embodiment

Figure 25:
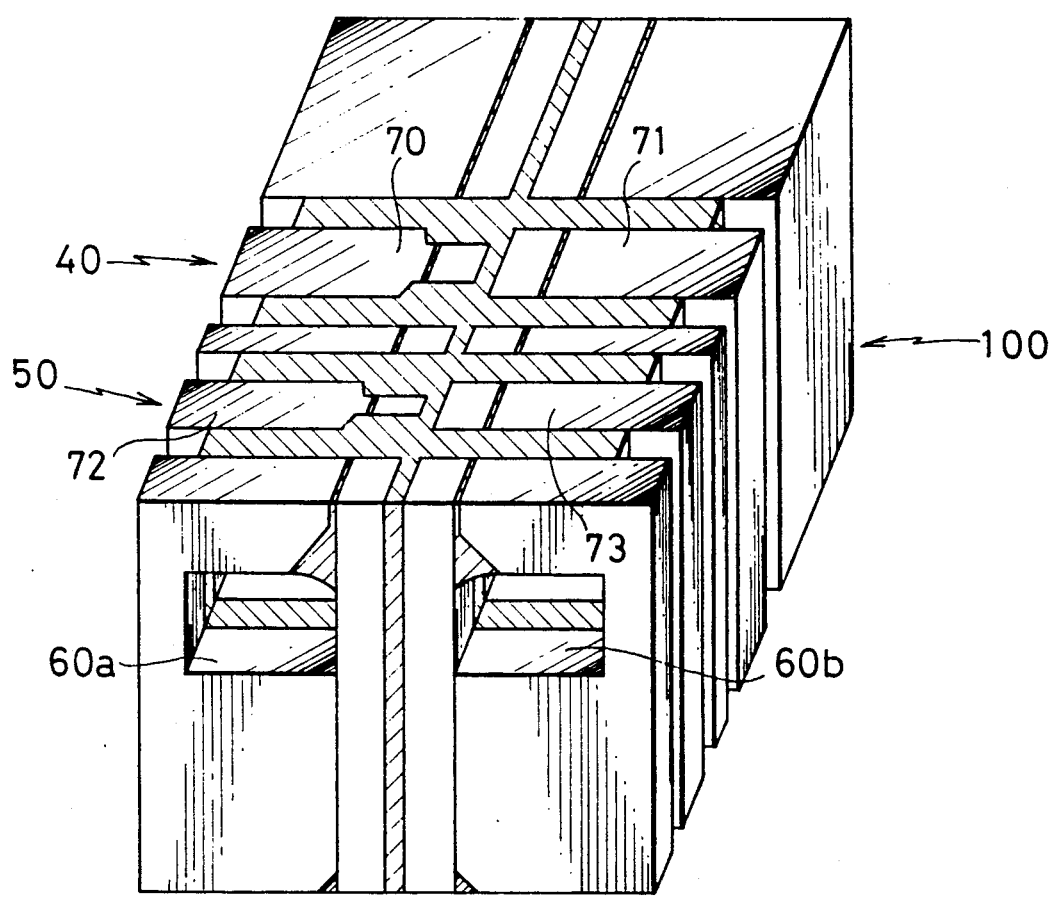
FIG. 25 is a perspective view of a magnetic head block of a sixteenth embodiment of the present invention.

FIG. 25 is a perspective view of a magnetic head block of a sixteenth embodiment of the present invention. In this embodiment, the lower rank complex head 40 is comprised of an advanced erase head 71 and R/W head 70. The higher rank complex head 50 is comprised of a W (wide writing) head 73 and R (narrow reading) head 72. The window portions 60a and 60b of the head core blocks described above are extended downward and the bottom portion 63 of the head core block 100 is cut down in order to provide core legs as shown in FIG. 13. After inserting the coil bobbins around the core legs, prismatic magnetic cores are bonded to the end surface of the core legs, respectively, in order to form a closed magnetic circuit. This type of complex magnetic head has good productivity but worse reproducing efficiency. In this embodiment, the magnetic closed circuit is provided without extending the window portion 60a and 60b as shown in FIG. 25. In this embodiment, the reproducing efficiency has increased, but the coils must be wound directly around the window 60a and 60b without using a bobbin.

Seventeenth embodiment

Figure 26:
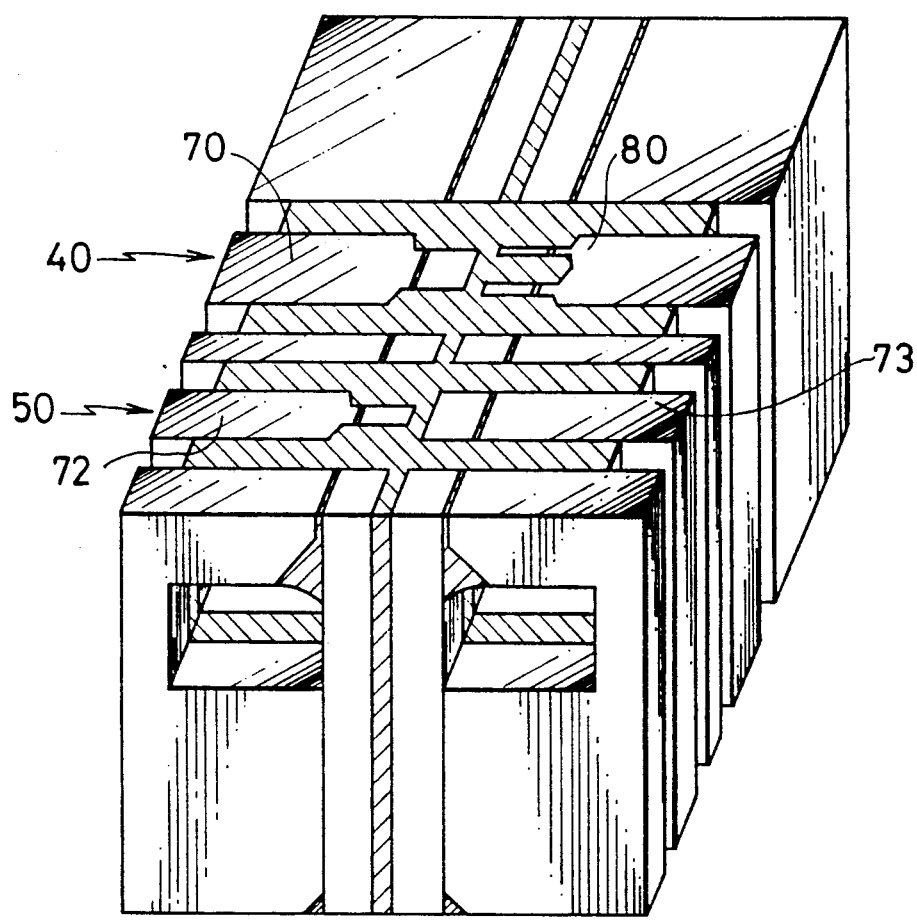
FIG. 26 is a perspective view of a magnetic head block of a seventeenth embodiment of the present invention.

FIG. 26 is a perspective view of a magnetic head block of a seventeenth embodiment of the present invention. In this embodiment, the lower rank complex head 40 is comprised of a R/W head 70 and a tunnel erase head 80 which is used for 1 MB or 2 MB FDDs. The higher rank complex head 50 is comprised of a W (wide writing) head 73 and R (narrow reading) head 72. By combining the lower rank complex head 40 and the higher rank complex head 50 as shown in FIG. 26, a large capacity FDD having compatibility with the existing 2/1 MB FDDs can be realized.

Eighteenth embodiment

Figure 27:
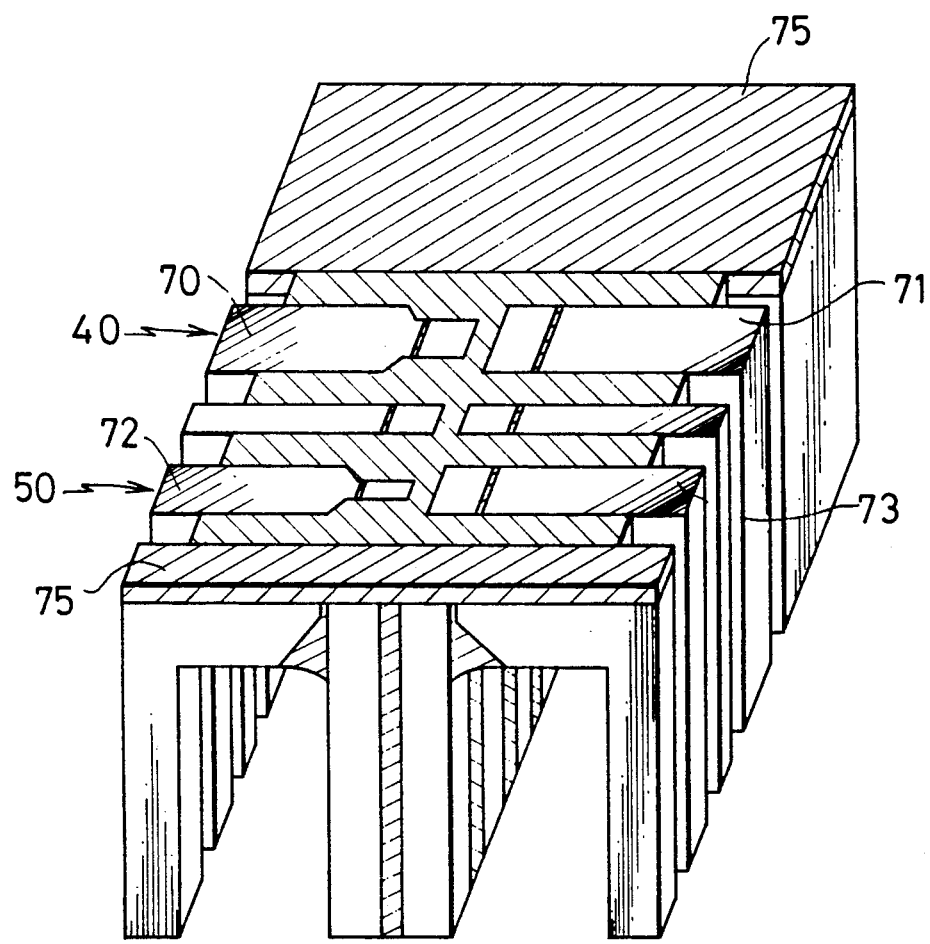
FIG. 27 is a perspective view of a magnetic head block of a eighteenth embodiment of the present invention.
Figure 28:
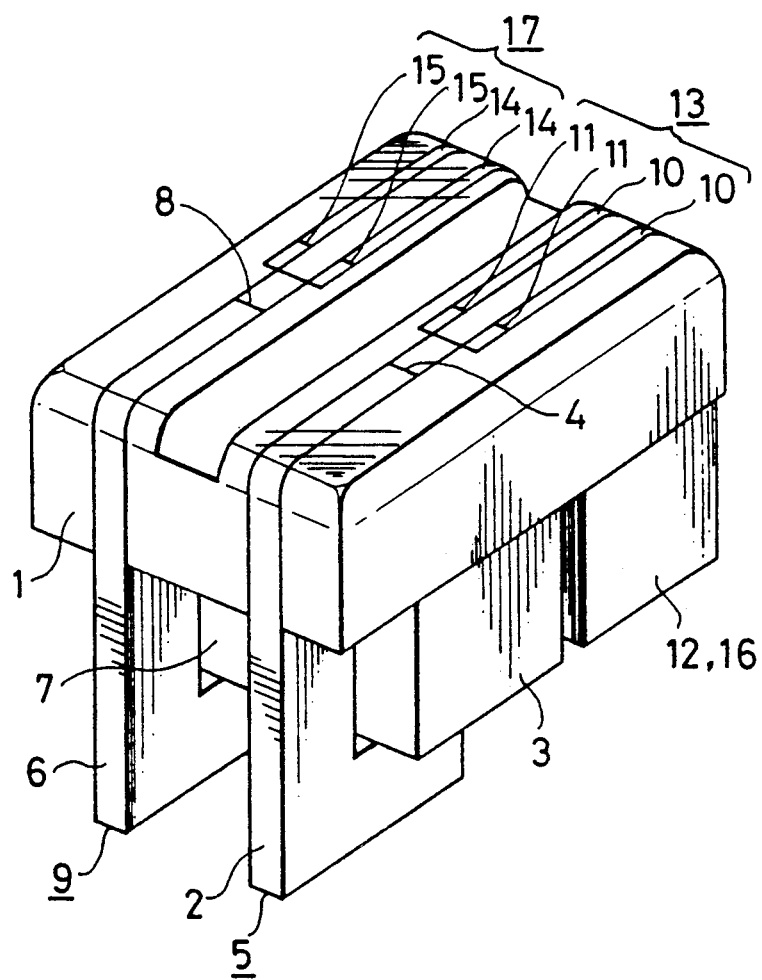
FIG. 28 is a perspective view of the prior art complex magnetic head.

FIG. 27 is a perspective view of a magnetic head block of an eighteenth embodiment of the present invention. The lower rank complex head 40 is comprised of an advanced erase head 71 and R/W head 70. The higher rank complex head 50 is comprised of a W (wide writing) head 73 and R (narrow reading) head 72. In this embodiment, the surface of the sliders are covered with film 75 such as barium titanate film or calcium titanate film having strong abrasion resistance and high hardness. These films are formed by a bonding or sputtering process on the slider surface.

What is claimed is:

1. A complex magnetic head, comprising:
   a R/W core block and an erase core block which are facing each other against both sides of a center core piece and are bound into one magnetic head block by melted glass;
   a R/W core formed between R/W core track width regulation grooves which have desired width and are filled with molded glass;
   an erase core formed between erase core track width regulation grooves which have desired width and are filled with molded glass and which are arranged parallel to and outside of the R/W core track width regulation grooves; and
   a shield member made of glass filling both track width regulation grooves.

2. A complex magnetic head, comprising:
   a higher rank magnetic head for writing a signal with a wide head and reading a signal with a narrow head; and
   a lower rank magnetic head using an advanced erase head arranged in parallel to the higher rank magnetic head via a non-magnetic body;
   wherein both magnetic heads are arranged between a pair of sliders.

3. A complex magnetic head according to claim 2, further comprising:
   a magnetic shield located between the higher rank magnetic head and the lower rank magnetic head within the non-magnetic body.

4. A complex magnetic head according to claim 2, wherein the writing gap of the higher rank magnetic head is aligned with the erase gap of the lower rank magnetic head, and the reading gap of the higher rank magnetic head is aligned with the R/W gap of the lower rank magnetic head.

5. A complex magnetic head, comprising:
   a R/W core block;
   an erase core block; and
   a center core piece located between the R/W block and the erase core block and bound into one magnetic head block by melted glass;
   the R/W core block having a R/W core width defined by a pair of R/W core track width defining grooves;
   the erase core block having an erase core width defined by a pair of erase core track width defining grooves, the pair of erase core track width defining grooves flanking the pair of R/W core track width defining grooves; and
   a shield member made of glass filling both track width defining grooves.

6. A complex magnetic head, comprising:
   a higher rank magnetic head having a wide head for writing a signal and a narrow head for reading a signal;
   a lower rank magnetic head having an advanced erase head arranged in parallel to the higher rank magnetic head; and
   a non-magnetic body separating the higher rank magnetic head from the lower rank magnetic head;
   wherein both magnetic heads are arranged between a pair of sliders.

7. A complex magnetic head according to claim 6, further comprising:
   a magnetic shield located within the non-magnetic body.

8. A complex magnetic head according to claim 6, wherein the higher rank magnetic head includes a writing gap and a reading gap and the lower rank magnetic head includes an erase gap and an R/W gap and the writing gap is aligned with the erase gap, and the reading gap is aligned with the R/W gap.

* * * * *